United States Patent [19]

Randmae et al.

[11] 4,394,692
[45] Jul. 19, 1983

[54] HOUSING ASSEMBLY FOR AN ELECTRICAL APPARATUS

[75] Inventors: Rein S. Randmae, Fort Salonga; Todd H. Whitaker, Smithtown, both of N.Y.

[73] Assignee: Vicon Industries, Inc., Plainview, N.Y.

[21] Appl. No.: 325,582

[22] Filed: Nov. 27, 1981

[51] Int. Cl.³ .............................................. H04N 5/30
[52] U.S. Cl. .................................................. 358/229
[58] Field of Search ................ 358/229, 99, 108, 217, 358/209; 455/347, 348; 361/380, 390, 422; 312/7.1, 7.2; 352/242; 354/64, 288

[56] References Cited

U.S. PATENT DOCUMENTS

| | | | |
|---|---|---|---|
| 4,281,343 | 7/1981 | Monteiro | 358/229 |
| 4,344,092 | 8/1982 | Miller | 358/229 |

*Primary Examiner*—John C. Martin
*Attorney, Agent, or Firm*—Darby & Darby

[57] ABSTRACT

A housing assembly is provided for use with a television surveillance camera or the like. The housing includes an extruded stationary base with identical frame-shaped front and rear fixed members, and a removable extruded cover which latches to the front and rear members. A television camera inside the housing may receive optical images through the front frame member and transmit these images via cables leaving the housing through the rear frame member.

A molded rubber end cap is adapted for detachable connection to the rear frame member, sealing out dust and contaminants when in place. The detachable end cap includes dustproof openings for the entry of cables into the rear of the housing with projections for strain relief incorporated into the openings. The openings are further connected by a slit in the rubber end cap, permitting cables to be inserted through the end cap without removing terminal connecting members. The periphery of the end cap is also formed with reinforcing gussets to provide shock protection at the rear edges of the housing assembly.

The extruded base further includes tracks for supporting a planar camera platform and permitting the platform to slide longitudinally with respect to the base. Specially designed quick release clamps permit the platform to be secured to the tracks when the camera is properly positioned relative to the front frame member of the housing.

7 Claims, 8 Drawing Figures

HOUSING ASSEMBLY FOR AN ELECTRICAL APPARATUS

BACKGROUND OF THE INVENTION

This invention relates generally to housing assemblies for electrical apparatus, and more particularly to housings which protect electrical equipment used for transmission or reception of light and other electromagnetic signals.

Housing assemblies have been widely used in the prior art to protect electrical apparatus such as television surveillance cameras from theft, shock and other physical disturbance. If properly constructed, these assemblies may also be useful in isolating the enclosed electrical device from dust and other atmospheric contaminants, as well as providing a more visually attractive casing than that of the device itself.

One of the problems associated with designing such housing assemblies is providing for rapid access to the equipment inside of them for servicing, adjustment or connection of external devices. The ever-increasing cost of labor for installation and service of electrical equipment requires that a housing assembly be designed to assist the technician in performing his work with a minimum of wasted effort. The present invention therefore incorporates a variety of novel and cost-efficient features which minimize the time that would otherwise be spent removing parts of the housing assembly to reach and adjust the electrical apparatus therein, or to make connections to terminals on or about the apparatus. The invention further provides these features while maintaining an environment for the apparatus which protects it and its connecting cables from shock, strain and external contaminants.

OBJECTS OF THE INVENTION

It is an object of this invention to provide an improved housing assembly having readily removable sections for enabling access to electrical apparatus housed therein and to the connection terminals of the apparatus.

Another object is to provide an improved housing assembly which saves production costs by using a plurality of identical housing members to perform different structural functions.

SUMMARY OF THE INVENTION

In accordance with a preferred, but nonetheless illustrative embodiment demonstrating objects and features of the present invention, there is provided a housing assembly for use with a television surveillance camera or the like. The housing includes an extruded stationary base with identical frame-shaped front and rear fixed members, and a removable extruded cover which latches to the front and rear members. A television camera inside the housing may receive optical images through the front frame member and transmit these images via cables leaving the housing through the rear frame member.

A molded rubber end cap is adapted for detachable connection to the rear frame member, sealing out dust and contaminants when in place. The detachable end cap includes dustproof openings for the entry of cables into the rear of the housing with projections for strain relief incorporated into the openings. The openings are further connected by a slit in the rubber end cap, permitting cables to be inserted through the end cap without removing terminal connecting members. The periphery of the end cap is also formed with reinforcing gussets to provide shock protection at the rear edges of the housing assembly.

The extruded base further includes tracks for supporting a planar camera platform and permitting the platform to slide longitudinally with respect to the base. Specially designed quick release clamps permit the platform to be secured to the tracks when the camera is properly positioned relative to the front frame member of the housing.

BRIEF DESCRIPTION OF THE DRAWINGS

In describing the preferred embodiment of the present invention, reference will be made to the appended drawings in which.

DESCRIPTION OF THE PREFERRED EMBODIMENT

Figure 1:
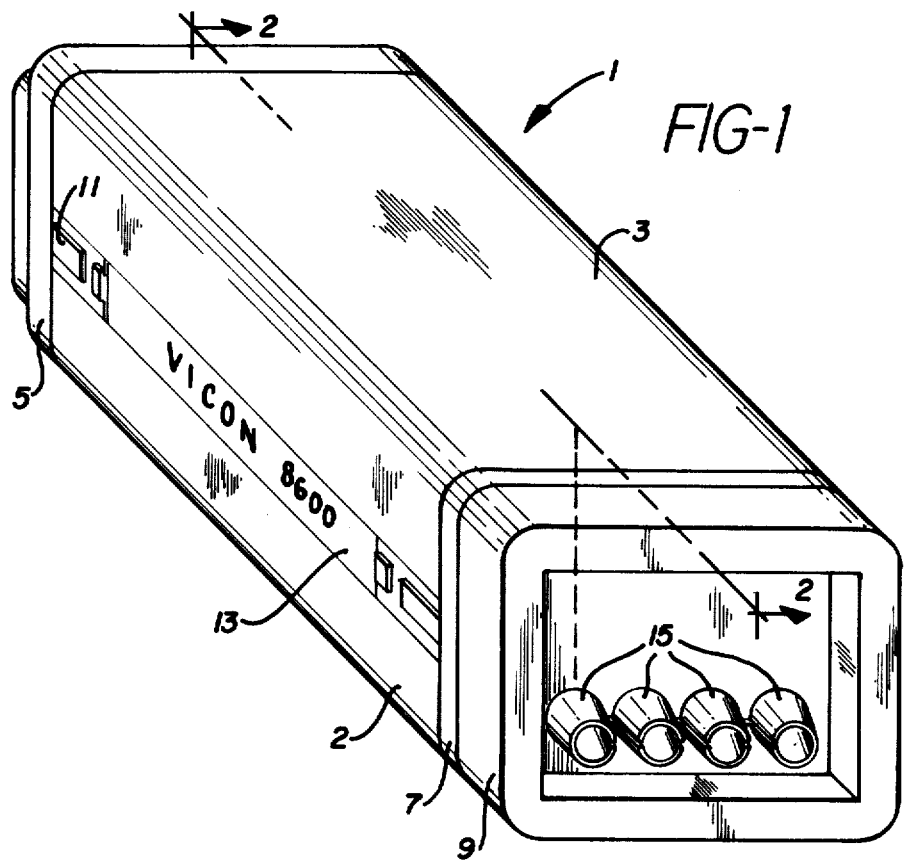
FIG. 1 is a perspective view of the housing assembly as viewed from the left rear corner thereof.

Referring now to the details of the drawing, FIG. 1 is a perspective view of a camera housing assembly 1 incorporating the invention, as seen from the left rear corner of the housing. The housing assembly 1 comprises a longitudinally extending lower half housing 2, which is substantially U-shaped in a lateral cross-section, and a longitudinally extending upper half housing 3, also U-shaped in lateral cross-section, which is designed to matingly engage the lower half housing 2 along the sides of the housing assembly 1. A stationary front housing member 5 is secured to the lower half housing, as by threaded screws, and a stationary rear housing member 7 is similarly secured to the rear of the lower half housing 2. A removable end cap 9, preferably made of an elastic material, mates with and snaps into the rear housing member 7.

Slide latches 11, mounted in longitudinal channels 13 formed on both sides of the upper half housing 3, are adapted to slide in their respective channels and mate with notches in the stationary front and rear housing caps to hold the upper half housing 3 in place atop the lower half housing 2. As illustrated in the drawing, the elastic or rubber end cap 9 may be formed with several cylindrical projections 15 for providing strain relief to electrical cables which connect a camera inside the housing to an external signal processing apparatus. The rubber end cap 9 is also adapted for easy detachment from the stationary rear housing member 7, in order to provide access to the rear portion of the camera mounted inside the housing assembly 1.

Figure 2:
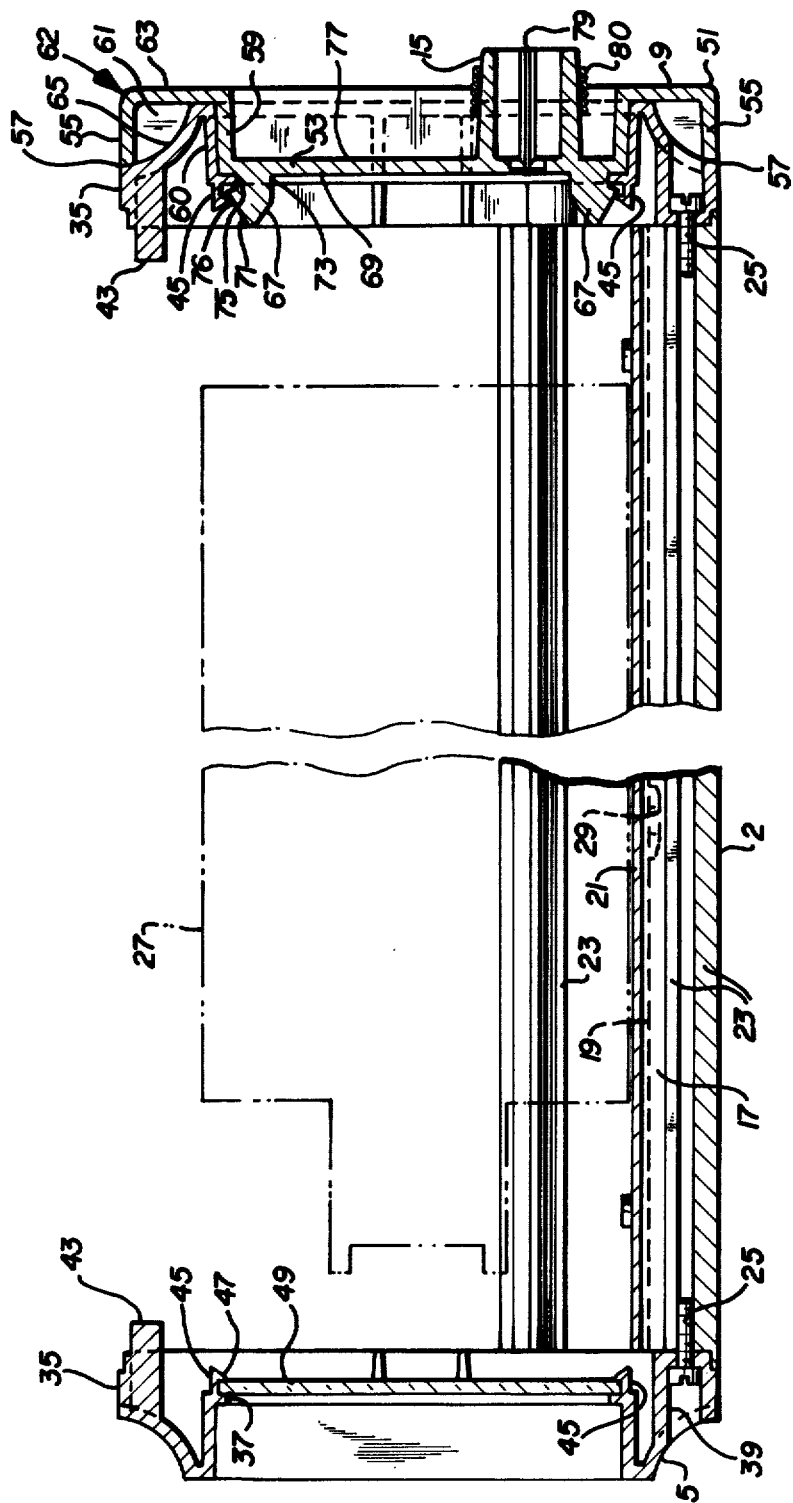
FIG. 2 is a cross-sectional view of the housing assembly taken through line 2—2 of FIG. 1.

FIG. 2 is a cross-sectional view of housing assembly 1 with the upper half housing 3 removed, taken through section line 2—2. The lower half housing 2, which is also illustrated in a front elevational view in FIG. 3, preferably consists of an extruded plastic or aluminum shell formed with vertical support walls 17 and horizontal support walls 19 for supporting a camera platform 21, and longitudinally extending channels 23 for providing stationary mounting of the housing members 5 and 7 to the ends of the lower half housing 2 via screws 25 or the like. A camera 27 (shown in imaginary lines in FIG. 2 for reference purposes) may be mounted to camera platform 21 with conventional fastening means, such as a mounting stud and threaded screw 29. The camera platform 21 and attached camera 27 may then be mounted in the lower half housing 2 and secured by clamps 31 to the horizontal support walls 19. This arrangement permits rapid adjustment of the camera position inside the housing assembly 1 by loosening the clamps 31 and sliding the camera platform 21 along the horizontal support walls 19 until the camera lens is as close to the front of the housing assembly 1 as is possible. The walls of the housing assembly 1 may limit the viewing angle of an improperly positioned camera; therefore, the distance from the camera lens to the front of the assembly should ordinarily be kept to a minimum to avoid a tunnel effect being created by the walls of the housing assembly 1.

Figure 3:
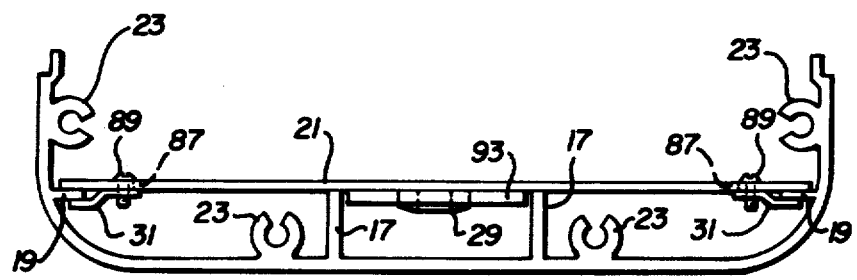
FIG. 3 is a front elevational view of the extruded base portion or lower half housing of the housing assembly shown in FIG. 1, with a camera platform and quick-release clamps attached.
Figure 4:
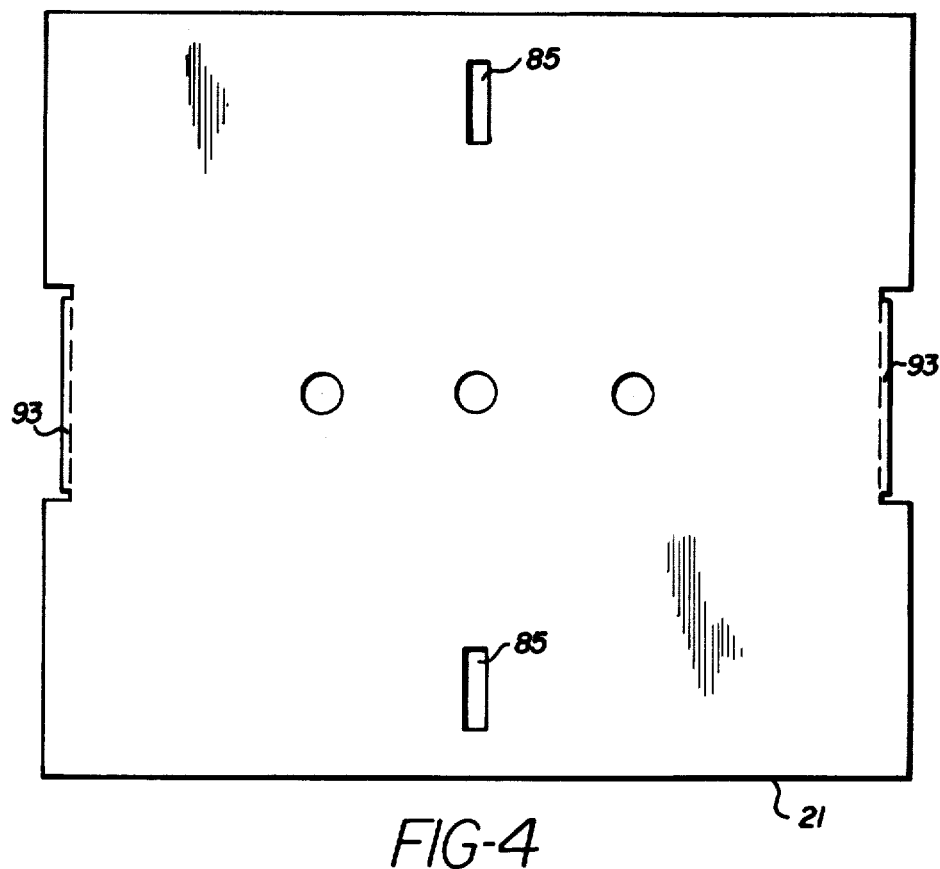
FIG. 4 is a plan view of a camera platform which may be clamped to the lower half housing as illustrated in FIG. 3.
Figure 5:
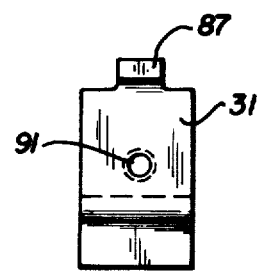
FIG. 5 is a plan view of a quick-release clamp used for holding the camera platform of FIG. 4 in place within the lower half housing as illustrated in FIG. 3.
Figure 6:
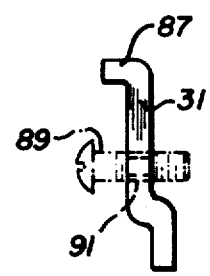
FIG. 6 is a side elevational view of the clamp illustrated in FIG. 5, with a threaded bolt shown in phantom view.

FIGS. 4, 5 and 6 illustrate the preferred forms of the camera platform 21 in plan view and the clamps 31 in plan and side views. The platform 21 is formed with two slots 85 which are dimensioned to accept both anti-torque tab 87 on clamp 31 and bolt 89, and to permit lateral sliding movement of the clamps 31 within their respective slots 85. Thus clamp 31 may be positioned under platform 21 with tab 87 in slot 85, and bolt 89 is inserted through the top of platform 21 and screws into the threaded aperture 91 on clamp 31, for securing it to the platform 21 as shown in FIG. 3. The placement of anti-torque tab 87 in slot 85 prevents the clamp 31 from rotating when the bolt 89 is tightened, thus facilitating longitudinal adjustment of platform 21 by permitting rapid locking and unlocking of the clamp 31 on the horizontal support wall 19 without access to the underside of the camera platform 21. Guide tabs 93 may also be formed at the front and rear of platform 21 to fit between the vertical support walls 17 on the lower half housing 2 and act as guides for permitting a smooth sliding movement of platform 21 when the clamps 31 are unlocked, as illustrated in FIG. 3. The length of slot 85 is designed to permit clamp 31 to slide toward the center of platform 21 when bolt 89 is loosened, thus moving the clamp out of engagement with horizontal support wall 19 and permitting rapid removal of platform 21 from the housing 1 for servicing of the camera.

Figure 7:
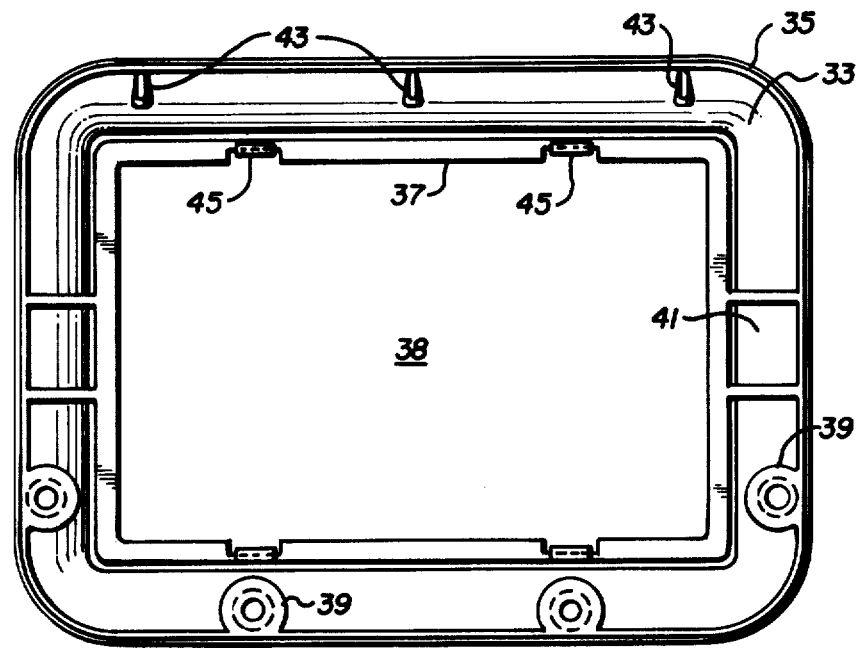
FIG. 7 is an elevational view of the back of one of the two frame-shaped members which are attached to either end of the lower half housing of FIG. 3.

Front and rear housing members 5 and 7, illustrated in side cross-section in FIG. 2 and in an elevational view in FIG. 7, are preferably identical pieces injection molded from a hard plastic such as ABS or Noryl N190. These members comprise a generally rectangular frame 33 with an outer periphery 35 which conforms to the contours of the mated upper and lower half housings 2 and 3. The inner perimeter 37 of the frame borders a generally rectangular area 38 through which the inside of the housing assembly may be accessed. The frame 33 is formed with four substantially cylindrical columns 39 inside of the outer periphery 35 which are positioned for alignment with the longitudinal channels 23 of the lower half housing 2. The columns 39 are dimensioned to accept a screw 25 for attaching the front and rear housing caps to the lower half housing. The frames 33 are further formed with a cavity 41 on both sides of the frame which is adapted to accept the sliding latches 11 on the upper half housing 3 to secure that housing in place atop the lower half housing 2 when the sliding latches 11 are engaged therein. Support projections 43 are formed inside the outer periphery 35 of the top of the frame 33, extending beyond the frame for providing support to the top of the upper half housing 3 when mated with the lower half housing 2. The inner perimeter 37 of the frame 33 is formed with four retaining fingers 45 having a lip portion 47 as seen in FIGS. 2 and 7. In the embodiment described, the four retaining fingers 45 of the front housing member 5 are used to hold a transparent window 49 in place inside the inner perimeter 37 of the housing member 5, as shown in FIG. 2. In operation, a camera 27 is positioned inside the housing assembly 1 with the front of the camera nearest to the window 49, which protects the camera lens from dust and other contamination.

Removable end cap 9 is designed to snap in place over the stationary rear housing member 7 in order to seal off the rectangular area 38 of that member and further provide strain relief for cables entering the rear of the housing assembly 1. The end cap 9 is preferably made of a synthetic elastomer in which the cylindrical projections 15, provided for strain relief, may be integrally formed. The elastic properties of the end cap 9 provide an additional benefit of insulating the camera inside the housing assembly 1 from shocks applied to the rear of the housing. As seen from the rear in FIG. 8, the end cap 9 comprises a generally rectangular, resilient, frame-shaped portion 51 with a vertical wall 53 inside the frame. As seen in the cross-sectional view of FIG. 2, the frame portion is generally U-shaped in cross-section, and is designed to fit over the rearmost part of the stationary rear housing member 7. The outer peripheral wall 55 of the resilient frame 51 abuts the outer periphery 35 of the rear housing member 7 along a junction line 57, conforming substantially to the shape of the rear housing member 7 and the mated upper and lower half housings 2 and 3. The inner sill 59 of the resilient frame 51 conforms to and substantially covers the corresponding inner sill 60 of the rear housing member 7. Peripherally spaced gussets 61, formed in the frame portion 51 inside the junction 62 of the outer wall 55 and the outer face 63, conform to the curved surface 65 of the rear housing member 7 adding support to the end cap 9 and providing additional cushioning against shock loads on the corner junctions 62 of the end cap 9.

Figure 8:
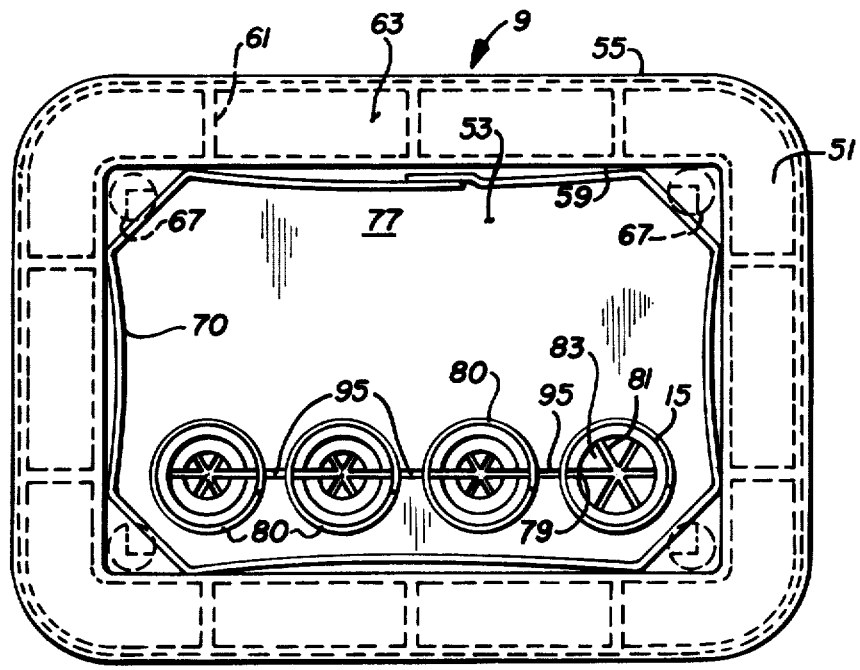
FIG. 8 is an elevational view of a detachable end cap having four strain relief members, which fits over the rear frame member illustrated in FIG. 7.

The vertical wall 53 of the end cap 9 covers the rectangular area 38 bordered by the inner perimeter 37 of the rear housing member 7, protecting the interior of the housing assembly 1 from dust and other contaminants. The end cap 9 is attached to the housing member 7 via four resilient, notched protrusions 67 formed in the corners of the interior surface 69 of the vertical wall 53. A tightly fitting retaining band 70, made of spring steel or other suitable material, may also be fitted inside the frame portion 51 to lock the end cap 9 in place as seen in FIG. 8. Protrusions 67, shown in cross-section in FIG. 2 and in phantom lines in FIG. 8, have a generally conical tip 71 attached to the vertical wall 53 by a trunk portion 73. The space between the base of the conical tip 71 and the vertical wall 53 forms a notch 75 in which the inner perimeter 37 of the rear housing member 7 is seated, when the end cap 9 is snapped onto it. The surface 76 of the base of the cone 71 is preferably slanted outwardly so that the protrusions will move out of engagement with the inner perimeter 37 of the housing member 7 when moderate force is applied to remove the end cap 9, just as the slanted surface of the cone 71 aids in the elastic displacement of the protrusions 67 when the end cap 9 is snap fitted onto the housing member 7.

The exterior surface 77 of the vertical wall 53 is formed with a set of hollow, substantially cylindrical projections 15, which provide strain relief for cables entering housing assembly 1. The projections 15 may be formed with a longitudinal split 79 which allows the resilient walls of the projection to expand outwardly and provide a snug fit around the walls of a cable which is inserted through the projection. Tightly wound springs 80 may then be press fit onto the cylindrical projections 15 to clamp the projection walls around their respective cables, thus preventing distortion of the end cap 9 at splits 79 and 95 due to cable pressure. The portion of the vertical wall 53 at the base of the cylindrical projections 15 may further be provided with radial cuts 81, forming a number of pie-shaped wedges 83 as seen in FIG. 5. The wedges 83 will be inwardly splayed when a cable is inserted through a cylindrical projection 15 into the housing assembly 1, the wedges forming a seal around the cable to prevent dust or moisture from entering the assembly.

In the preferred embodiment of the invention, the resilient vertical wall 53 is formed with a slit 95 connecting the cylindrical projections 15. This feature facilitates the entry of transmission lines and other cables into the housing assembly 1 without the need to remove connectors which may be attached to the ends of the cables. This entry may be accomplished by separating the resilient vertical wall 53 at the slit 95, inserting the connector through the separated slit 95, and sliding the cable along this opening until it seats in a desired cylindrical projection 15. When the cable is properly seated, the resilient vertical wall 53 will return to its original configuration, sealing the inside of the housing assembly 1 from dust and other contaminants as described previously.

Although the above description discloses a preferred form of the invention for illustrative purposes, those skilled in the art will appreciate that many additions, modifications or substitutions may be made without departing from the scope and spirit of the invention as defined in the accompanying claims.

What is claimed is:

1. A housing assembly for an electronic surveillance camera comprising:
    a lower housing for providing support to said camera having a frame portion at the rearward end thereof, said rear frame portion defining an open space through which connections may be made from the exterior of said housing assembly to its interior;
    an upper housing matingly engaging said lower housing to create an enclosed region within said housing assembly;
    an end cap detachably connected to said frame portion of said lower housing and covering said open space in said frame portion to seal said enclosed region from contaminants external to said housing assembly,
    said end cap being constructed of a single piece of resilient material and comprising:
    means for relieving strain on a cable entering said housing assembly through said end cap, said end cap having a slit communicating with said strain relief means for facilitating entry of cables therethrough, and
    resilient notched protrusions extending from said end cap and spaced so as to engage the inner rim of said frame portion to provide detachable connection between said end cap and said frame portion.

2. A housing assembly as in claim 1 wherein said strain relief means further comprises dust barrier means for preventing said contaminants from entering said enclosed region through the space between said strain relief means and said cable.

3. A housing assembly as in claim 2 wherein said end cap further comprises means for absorbing shock loads transmitted to said housing assembly, locating about the periphery of said end cap.

4. A housing assembly as in claim 1 wherein said lower housing further comprises a frame portion at the front end thereof, said front frame portion defining an area through which signals may be transmitted to said electrical apparatus, said front and rear frame portions comprising separate elements formed from substantially identical molds and fixably attached to said lower housing portion.

5. A housing assembly as in claim 4 further comprising at least one sliding latch positioned on said upper housing and engaging said front frame member, and at least one sliding latch positioned on siad upper housing and engaging said rear frame member, said sliding latches providing detachable connection of said upper housing to said housing assembly.

6. A housing assembly as in claim 1, further comprising a platform adapted for mounting to said electronic surveillance camera;
    said lower housing comprising a substantially U-shaped, longitudinally extruded member having track means comprising at least one extruded flange extending along the length of said U-shaped member for supporting said platform in a longitudinally slidable relationship relative to said lower housing; and
    clamping means for fixing said platform at a plurality of longitudinal positions along said track means.

7. A housing assembly as in claim 6 wherein said clamping means comprises a clamping plate having a threaded aperture and an anti-torque tab extending normal to the plane of said plate;
    a bolt cooperatively threaded with said aperture, and said platform further including a laterally elongated slot dimensioned to permit lateral sliding movement of said anti-torque tab and said bolt within said slot, and having a width less than the distance from said tab to said bolt for preventing rotation of said plate when said bolt is turned.

* * * * *